United States Patent
Buehler et al.

(10) Patent No.: US 10,831,493 B2
(45) Date of Patent: Nov. 10, 2020

(54) HARDWARE APPARATUS TO MEASURE MEMORY LOCALITY

(71) Applicant: International Business Machines Corporation, Armonk, NY (US)

(72) Inventors: Markus Buehler, Weil im Schoenbuch (DE); Burkhard Steinmacher-Burow, Esslingen am Neckar (DE); Arni Ingimundarson, Karlsruhe (DE); Thilo Maurer, Stuttgart (DE); Benedikt Rombach, Tübingen (DE)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 16/220,262

(22) Filed: Dec. 14, 2018

(65) Prior Publication Data

US 2020/0192669 A1  Jun. 18, 2020

(51) Int. Cl.
| | |
|---|---|
| *G06F 17/00* | (2019.01) |
| *G06F 3/06* | (2006.01) |
| *G06F 9/38* | (2018.01) |
| *G06F 9/30* | (2018.01) |
| *G06F 9/48* | (2006.01) |
| *G06F 9/355* | (2018.01) |

(52) U.S. Cl.
CPC ........ *G06F 9/3806* (2013.01); *G06F 9/30123* (2013.01); *G06F 9/355* (2013.01); *G06F 9/485* (2013.01)

(58) Field of Classification Search
None
See application file for complete search history.

(56) References Cited

U.S. PATENT DOCUMENTS

| | | | |
|---|---|---|---|
| 7,017,020 B2 | 3/2006 | Herbst et al. | |
| 7,581,064 B1 | 8/2009 | Zedlewski et al. | |
| 8,041,915 B1 | 10/2011 | Wahlig et al. | |
| 8,381,204 B2 * | 2/2013 | Das | G06F 8/456 |
| | | | 717/154 |
| 9,367,465 B2 | 6/2016 | Saraswati | |

(Continued)

OTHER PUBLICATIONS

Jonathan Weinberg, Michael O. McCracken, Erich Strohmaier, Allan Snavely, ". Quantifying Locality in the Memory Access Patterns of HPC Applications," Proceedings of the 2005 ACM/IEEE conference on Supercomputing, p. 50, Nov. 12-18, 2005.

(Continued)

*Primary Examiner* — Hyun Nam
(74) *Attorney, Agent, or Firm* — Patterson + Sheridan, LLP (57) ABSTRACT

A buffer is configured to store a plurality of last addresses accessed by a processor core from a memory. A minimum distance extraction circuit determines distances of a current memory address accessed by the processor core from each of the plurality of last addresses in the buffer and determines a minimum distance from the distances. A limit determination circuit compares the minimum distance to each of a plurality of ranges of distances and selects a range of the plurality of ranges within which the minimum distance falls. Each of a plurality of counters of a counter circuit is associated with a corresponding one of the plurality of ranges. A counter of the plurality of counters is to be incremented corresponding to the selected range.

20 Claims, 6 Drawing Sheets

(56) References Cited

U.S. PATENT DOCUMENTS

| | | | |
|---|---|---|---|
| 2005/0204114 A1* | 9/2005 | Yoder | G06F 12/0284 |
| | | | 711/203 |
| 2006/0107025 A1* | 5/2006 | Cypher | G06F 12/0864 |
| | | | 711/216 |
| 2009/0006808 A1* | 1/2009 | Blumrich | G06F 15/17337 |
| | | | 712/12 |
| 2011/0219208 A1* | 9/2011 | Asaad | G06F 12/0862 |
| | | | 712/12 |
| 2015/0046411 A1* | 2/2015 | Kazmaier | G06F 17/10 |
| | | | 707/693 |
| 2015/0356759 A1* | 12/2015 | Delling | G01C 21/3446 |
| | | | 345/440 |
| 2016/0188222 A1* | 6/2016 | Miller | H04L 67/1017 |
| | | | 711/125 |
| 2016/0371015 A1* | 12/2016 | Gay | G06F 12/0802 |
| 2017/0228164 A1 | 8/2017 | Jayasena et al. | |
| 2019/0361808 A1* | 11/2019 | Subramanian | G06N 3/084 |

OTHER PUBLICATIONS

Mustafa M. Tikir, Jeffrey K. Hollingsworth, "Using Hardware Counters to Automatically Improve Memory Performance," Computer Science Department, 2004, University of Maryland.

Hockauf et. al, "Exploiting Spatial and Temporal Locality of Accesses: A New Hardware-Based Monitoring Approach for DSM Systems," SMILE: Shared Memory in a LAN-like Environment, 1998, 10 pages.

\* cited by examiner

HARDWARE APPARATUS TO MEASURE MEMORY LOCALITY

BACKGROUND

The present invention relates to computer processors, and more specifically, to a memory locality circuit for determining memory address access patterns of a processor core.

A parameter of processes running on a computing system is memory access performance. Programs include instructions and data which are fetched from memory. The amount of time required to access instructions and data from memory by a program has an important effect on the performance of the program as well as the computer system, particularly where the computer system runs many processes in parallel. The amount of time required to access instructions and data from memory has a strong dependency on how and when the memory is accessed, e.g. a memory access pattern.

Good performance of the computer system is indicated when a processor core executes instructions that access consecutive addresses in main memory. Poor performance of the computer system is indicated when a processor core executes instructions that access widely dispersed locations in memory. It is desirable to attempt to reduce randomness in memory access patterns by having one or more tools available that provide a measure of randomness of memory access patterns, and then take steps to reduce the measure of randomness. These tools can further be employed to determine an ideal page size or an appropriate size of a cache.

Available software-based tools for determining memory access patterns suffer from large run-time overhead for execution of a program, as software code is inserted into each instance of a memory access in the executing program. Available hardware-based tools work on system level, but not on a processor core level. These available hardware based tools identify often used memory areas, but provide no direct information about average memory locality. These hardware based tools also increase the cost of a computer system by adding circuitry.

SUMMARY

According to one embodiment of the present disclosure, a memory locality circuit for determining memory address access patterns of a processor core is disclosed. The memory locality circuit includes a buffer configured to store a plurality of last addresses accessed by a processor core from a memory. The memory locality circuit further includes a minimum distance extraction circuit to determine distances of a current memory address accessed by the processor core from each of the plurality of last addresses in the buffer and to determine a minimum distance from the distances. The memory locality circuit further includes a limit determination circuit to compare the minimum distance to each of a plurality of ranges of distances. Each of the plurality of ranges of distances has a different lower and upper bound, or only a different upper bound. The limit determination circuit is further to select a range of the plurality of ranges within which the minimum distance falls. The memory locality circuit further includes a counter circuit having a plurality of counters. Each of the plurality of counters is associated with a corresponding one of the plurality of ranges. A counter of the plurality of counters is to be incremented corresponding to the selected range.

According to one embodiment of the present disclosure, a computer processor is disclosed. The computer processor includes one or more processor cores, one or more memories coupled to the one or more processor cores, and one or more memory locality circuits for determining memory address access patterns of the one or more memories by the one or more processor cores. Each of the one or more memory locality circuits includes a buffer configured to store a plurality of last addresses accessed by a processor core from a memory. Each of the one or more memory locality circuits further includes a minimum distance extraction circuit to determine distances of a current memory address accessed by the processor core from each of the plurality of last addresses in the buffer and to determine a minimum distance from the distances. Each of the one or more memory locality circuits further includes a limit determination circuit to compare the minimum distance to each of a plurality of ranges of distances. Each of the plurality of ranges has a different upper bound. The limit determination circuit is further to select a range of the plurality of ranges of distances within which the minimum distance falls. Each of the one or more memory locality circuits further includes a counter circuit having a plurality of counters. Each of the plurality of counters is associated with a corresponding one of the plurality of ranges. A counter of the plurality of counters is to be incremented corresponding to the selected range.

According to one embodiment of the present disclosure, a method for determining memory address access patterns of a processor core. The method includes storing, by a buffer, a plurality of last addresses accessed by the processor core from a memory. The method further includes determining, by a minimum distance extraction circuit, distances of a current memory address accessed by the processor core from each of the plurality of last addresses in the buffer and to determining a minimum distance from the distances. The method further includes comparing, by a limit determination circuit, the minimum distance to each of a plurality of ranges of distances, wherein each of the plurality of ranges of distances has a different upper bound, and, selecting, by the limit determination circuit, a range of the plurality of ranges within which the minimum distance falls. The method further includes incrementing, by a counter circuit having a plurality of counters, wherein each of the plurality of counters is associated with a corresponding one of the plurality of ranges, a counter of the plurality of counters corresponding to the selected range.

DETAILED DESCRIPTION

A memory locality circuit associated with processor core that determines memory access patterns of the processor core with a memory is disclosed. The memory locality circuit includes hardware counters that give an overview of the distance of a new memory access to its N predecessor memory accesses. In one embodiment, the memory locality circuit watches memory accesses issued by the core. The memory locality circuit obtains copies of memory addresses being accessed by the processor core and stores the last n memory addresses accessed in a FiFo. The memory locality circuit further includes a set of distance range comparators (or buckets) and a set of counters for these buckets. For each new memory access, the memory locality circuit compares the new memory address with the addresses stored in the FiFo. The memory locality circuit determines the closest address in the FiFo and computes a distance representing a minimum distance of all of the addresses in the FiFo to the new address. The memory locality circuit determines using the comparators which range the determined minimum distance falls within, and then increments a counter associated with that range. The memory locality circuit then replaces oldest address in the FiFo with the new address. Using a software program that communicates with the memory locality circuit, the user can read out the bucket counters and obtain an overview of the memory access patterns. Accordingly, the memory locality circuit measures statistics to identify what kind of memory access pattern is being produced in a running application running on the processor core in a real-time execution environment without impacting the performance of the processor core.

Figure 1:
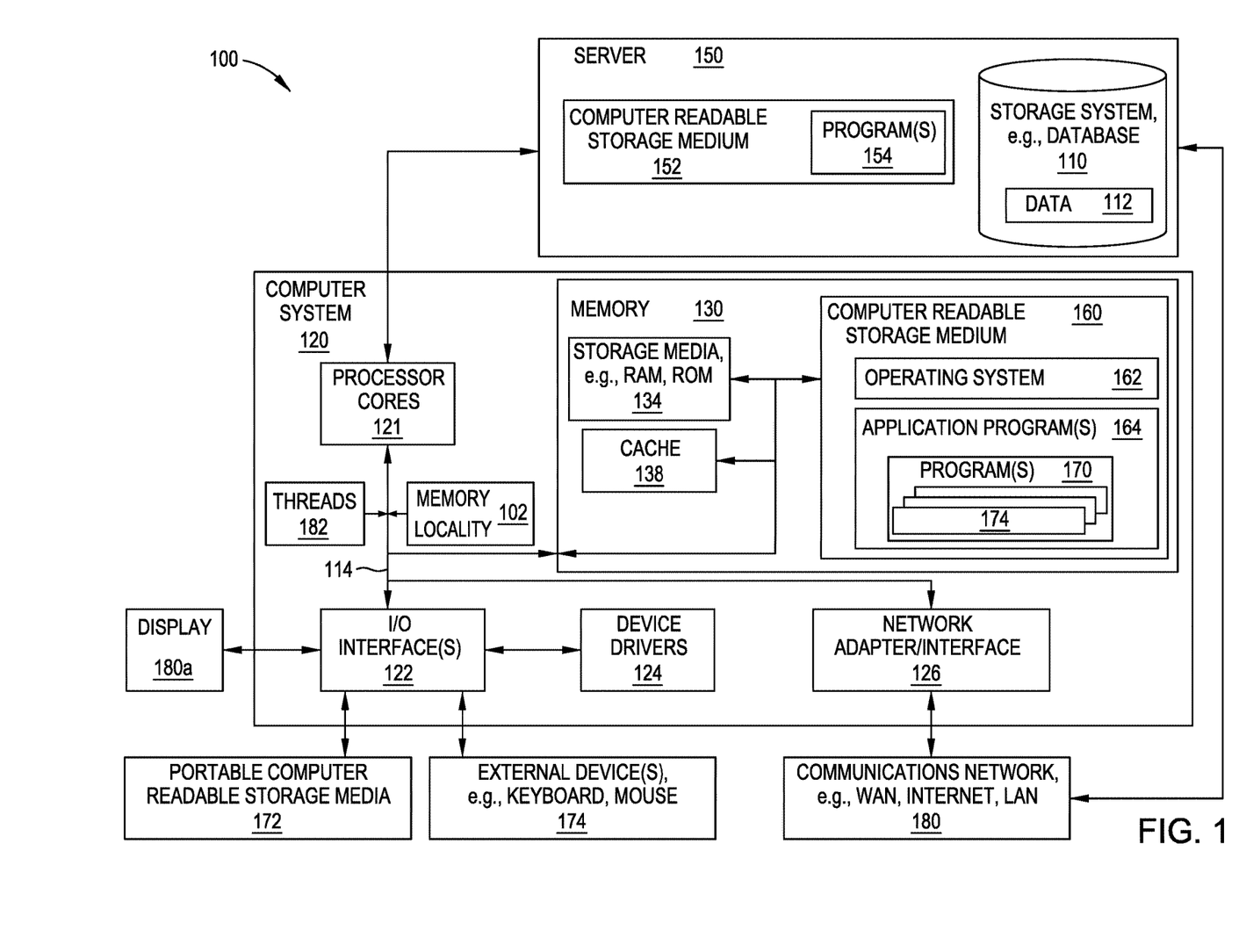
FIG. 1 illustrates a computer system that implements a memory locality circuit in accordance with an embodiment of the present disclosure.

FIG. 1 illustrates a computer system 100 that implements one or more memory locality circuits 102 in accordance with an embodiment of the present disclosure. The components of a computer 120 of the computer system 100 may include, but are not limited to, one or more processor cores 121, one or more corresponding hardware thread circuits 182, a system memory 130, and a bus 114 that couples various system components including system memory 130 to processor cores 121.

The bus 114 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 120 typically includes a variety of computer readable media. Such media may be any available media that is accessible by the computer 120 (e.g., computer system, or server), and can include both volatile and non-volatile media, as well as, removable and non-removable media.

Computer memory 130 can include additional computer readable storage media 134 in the form of volatile memory, such as random access memory (RAM) and/or cache memory 138. The one or more memory locality circuits 102 are configured to measure memory locality by providing in hardware an overview of memory access patterns of the random access memory (RAM) associated with the one or more hardware processor threads 182 of the one or more processor cores 121. The memory access patterns are discerned by a memory locality circuit 102 tracking a distance of a succeeding memory access to N predecessor memory accesses, where N is greater than zero. The memory locality circuit 102 provides as output a plurality of counts of one or more ranges of sizes of minimum distances of succeeding memory accesses to their respective N predecessor memory accesses. These counts may be processed in software and stored back in computer memory 130 in the form of a histogram that may be displayed on a display 180a for viewing the access patterns by a user that desires to monitor the memory access patterns to determine how to optimize said patterns.

The computer 120 may further include other removable/non-removable, volatile/non-volatile computer storage media, in one example, portable computer readable storage media 172. In one embodiment, a computer readable storage medium 152 can be provided for reading from and writing to a non-removable, non-volatile magnetic media. The computer readable storage medium 152 can be embodied, for example, as a hard drive. Additional memory and data storage can be provided, for example, as a storage system 110 (e.g., a database) for storing data 112 and communicating with the processing cores 121. The database can be stored on or part of a server 150. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 114 by one or more data media interfaces. As will be further depicted and described below, memory 130 may include at least one program product which can include one or more program modules that are configured to carry out the functions for processing a plurality of counts of one or more ranges of sizes of minimum distances of succeeding memory accesses to their respective N predecessor memory accesses output by the one or more memory locality circuit 102 or displaying corresponding histograms of memory access patterns.

One or more computer programs can generically be referred to as a program 160. The program 160 can include program modules 154, and may be stored in memory 130. By way of example, the memory 130 may store an operating system 152, an application program 154, other program modules, and program data, including the counts and/or histogram output by the one or more memory locality circuits 102. The program modules 154 can generally carry out functions and/or methodologies that format for display or further process the counts and/or histogram to improve memory access patterns. The one or more programs 170 are stored in memory 130 and are executable by the one or more processor cores 121. It is understood that the operating system 162 and application program 164 stored on the computer readable storage medium 160 are similarly executable by the one or more processor cores 121.

The computer 120 may also communicate with one or more external devices 174 such as a keyboard, a pointing device, the display 180a, etc.; one or more devices that enable a user to interact with the computer 120; and/or any devices (e.g., network card, modem, etc.) that enables the computer 120 to communicate with one or more other computing devices. Such communication can occur via Input/Output (I/O) interfaces 122. Still yet, the computer 120 can communicate with one or more networks 180 such as a local area network (LAN), a general wide area network (WAN), and/or a public network (e.g., the Internet) via network adapter/interface 126. As depicted, network adapter 126 communicates with the other components of the computer 120 via bus 114. It should be understood that although not shown, other hardware and/or software components could be used in conjunction with the computer 120. Examples, include, but are not limited to: microcode, device drivers 124, redundant processing units, and external disk drive arrays, RAID systems, tape drives, and data archival storage systems, etc.

The program modules 154 that carry out the functions and/or methodologies that format for display or further process the counts and/or histogram to improve memory access patterns may be embodied in a program 170 embodied on a computer readable storage device, for example, generally referred to as memory 130, and can more specifically refer to computer readable storage medium 160, as shown in FIG. 1. The program 170 is executable by the one or more processor cores 121 of the computer system 120 (to execute program steps, code, or program code). Additional data storage may also be embodied as the database 110 which includes data 112. The program or executable instructions may be offered as a service by a provider. The computer 120 and program 170 shown in FIG. 1 are generic representations of a computer and program that may be local to a user, or provided as a remote service (for example a cloud based service), and may be provided in further examples, using a website accessible using a network 180 (e.g., interacting with a network, the Internet, or cloud services). It is understood that the computer 120 and computer system 100 also generically represents herein a computer device or a computer included in a device, such as a laptop or desktop computer, etc., or one or more servers, alone or as part of a datacenter. The computer 120 and computer system 100 can include the network adapter/interface 126, and the input/output (I/O) interface(s) 122. The I/O interface 122 allows for input and output of data with an external device 174 that may be connected to the computer system. The network adapter/interface 126 may provide communications between the computer system and a computer network generically shown as the network 180. The program 170 and program modules 174 can execute specific steps, routines, sub-routines, instructions or code. The program 170 can be run locally on a device such as a mobile device, or can be run a service, for instance, on the server 150 which may be remote and can be accessed using the communications network 180.

It is understood that a computer or a program running on the computer 120 may communicate with a server, herein embodied as the server 150, via one or more communications networks, herein embodied as the network 180. The communications network 180 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

Figure 2:
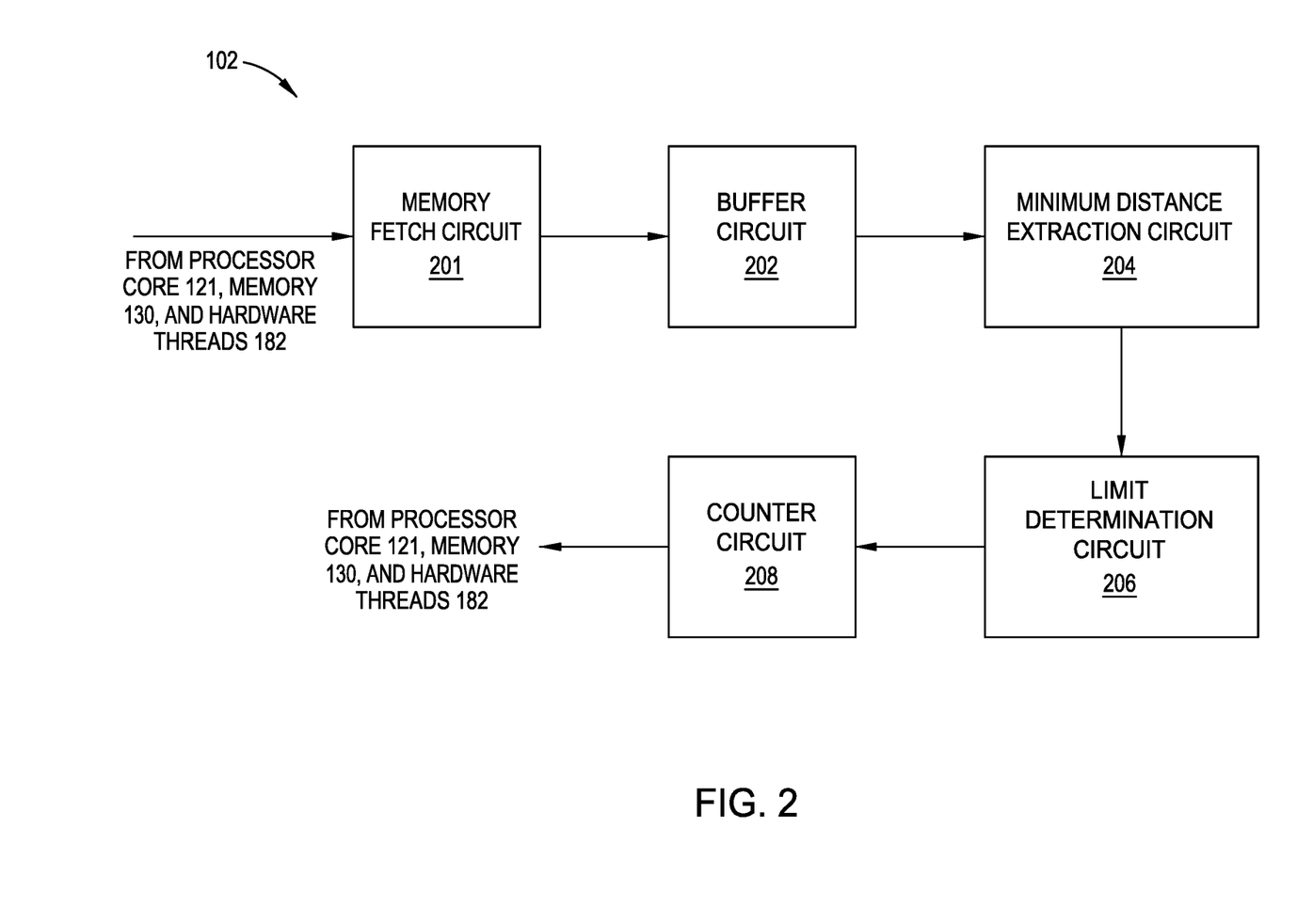
FIG. 2 is an electrical block diagram of one embodiment of a memory locality circuit according to one embodiment of the present disclosure.

FIG. 2 is an electrical block diagram of one embodiment of a memory locality circuit 102. The memory locality circuit 102 comprises a buffer circuit 202, a minimum distance extraction circuit 204, a limit determination circuit 206, and a counter circuit 208. Each of the circuits 202, 204, 206, 208 may be implemented by circuitry that already exists on the computer 120, or may be added to circuitry of the computer 120. When the computer 120 implements a plurality of processor cores 121 and a plurality of memories 130 coupled to the plurality of processor cores 121 of one or more hardware processor threads 182, the computer 120 may couple same to corresponding one or more memory locality circuits 102.

The buffer circuit 202 is configured to store a plurality of last addresses accessed by a processor core 121 from the memory 130 in the buffer circuit 202. The memory 130 from which the buffer circuit 202 stores accessed addresses may be RAM memory. The minimum distance extraction circuit 204 determines distances of a current memory address accessed by the processor core 121 from each of the plurality of last addresses in the buffer circuit 202 and determines a minimum distance from the distances. The limit determination circuit 206 compares the minimum distance to each of a plurality of ranges of distances. Each of the plurality of ranges of distance has different bounds. The limit determination circuit 206 selects a range of the plurality of ranges within which the minimum distance falls. The counter circuit 208 has a plurality of counters (not shown). Each of the plurality of counters is associated with a corresponding one of the plurality of ranges of distance. A counter of the plurality of counters is to be incremented corresponding to the determined range.

Figure 3:
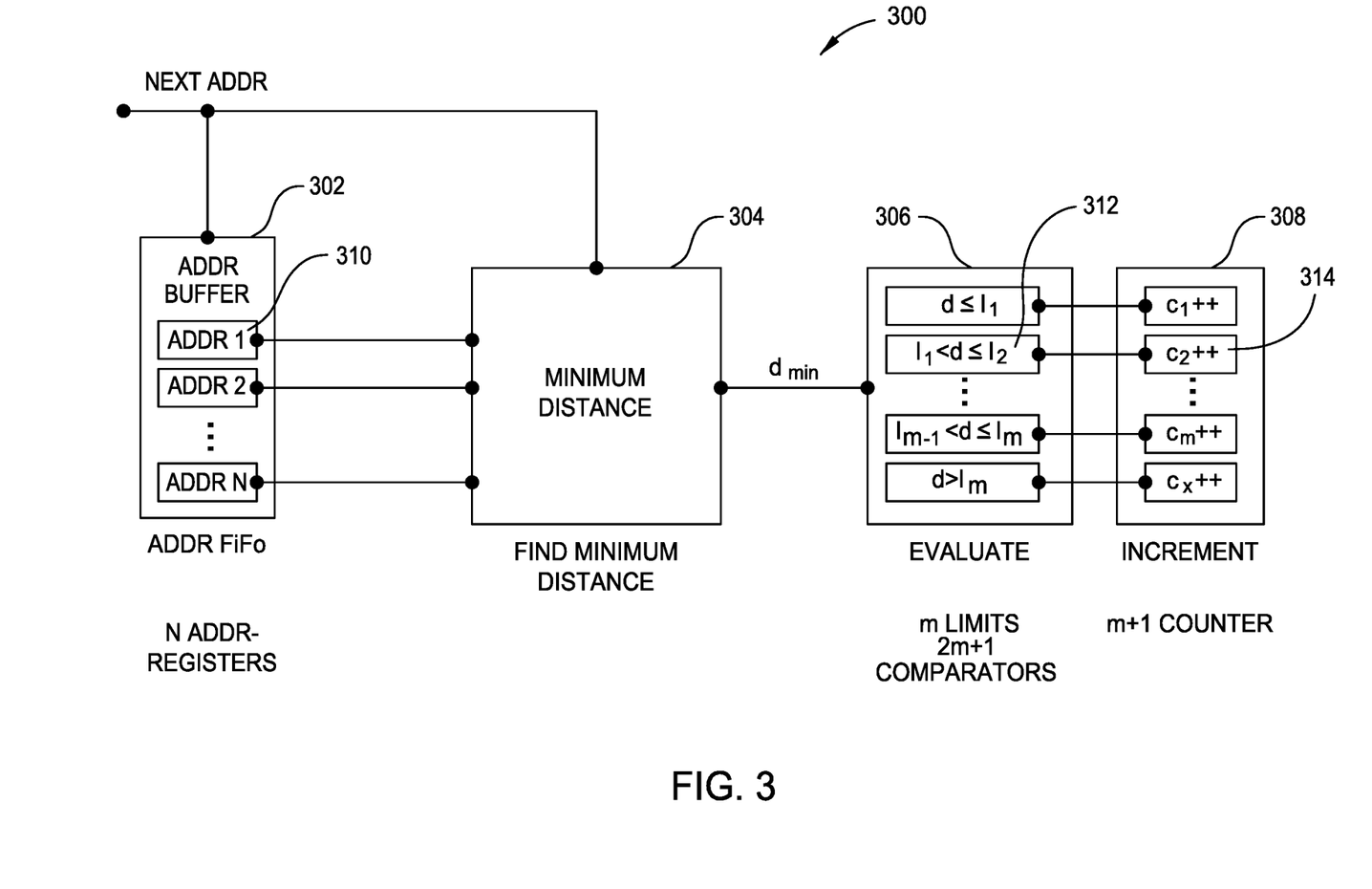
FIG. 3 is an electrical block diagram of one implementation of the memory locality circuit of FIG. 2.

FIG. 3 is an electrical block diagram of one specific implementation 300 of the memory locality circuit 102 of FIG. 2. The memory locality circuit 300 comprises a buffer circuit 302, a minimum distance extraction circuit 304, a limit determination circuit 306, and the counter circuit 308. The buffer circuit 302 is configured to store the last N addresses in N address registers 310 accessed by a processor core 121 from the memory 130, where N is greater than zero. The memory 130 from which the buffer circuit 302 stores accessed addresses may be RAM memory. The buffer circuit 302 may be organized as a first-in, first-out (FIFO) buffer 202 of address registers 310.

Figure 4:
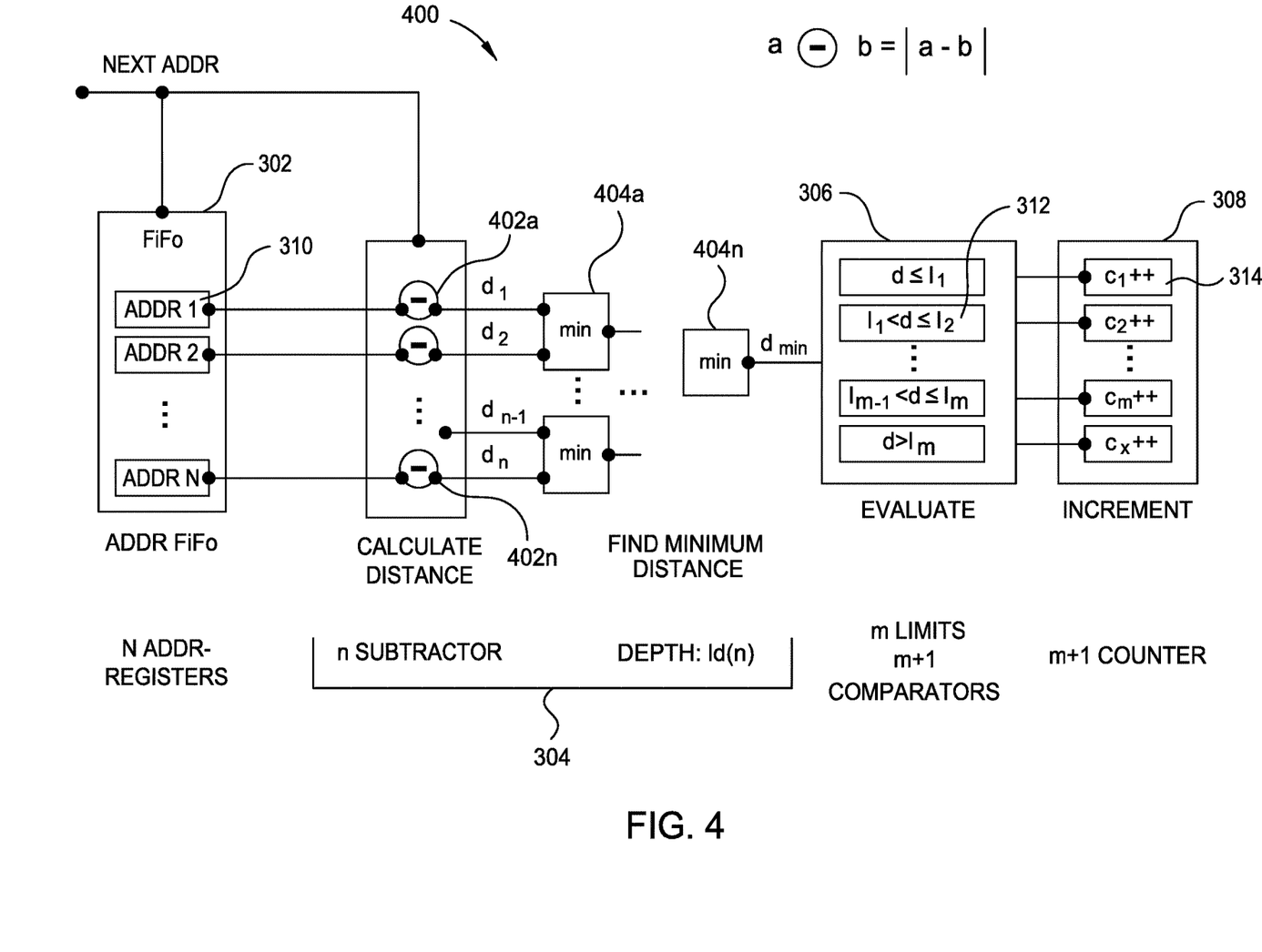
FIG. 4 is an electrical block diagram illustrating an implementation of the minimum distance extraction circuit of FIG. 3.

The minimum distance extraction circuit 304 determines distances of a current memory address accessed by the processor core 121 from each of the plurality of last addresses in the address registers 310 of the buffer 302 and to determine a minimum distance, $d_{min}$ from the distances. FIG. 4 is an electrical block diagram illustrating an implementation of the minimum distance extraction circuit 304 of FIG. 3. Referring now to FIG. 4, the minimum distance extraction circuit 304 may be implemented as a reduction tree of subtraction circuits 402a -402n and minimum of two blocks 404a -404n. In an example, the addresses stored in each adjoining pair of address registers 302 is subtracted from each other using a subtraction block (e.g., 402a ) to produce a plurality of N/2 distances $(d_1/d_2, \ldots d_{n-1}/d_n)$ of which each pair is then compared by N/2 minimum of two blocks 404a -404n to produce N/2 minimum sub-distance. Each of these N/2 minimum sub-distances is fed to adjoining N/4 minimum of two blocks 404a -404n to produce N/4 minimum sub-sub-distances, and so on until a single minimum distance $d_{min}$ is obtained from the last minimum of two blocks 404n. If N is not a power of 2, some of the 404 blocks maybe replaced by simple connections.

Referring again to FIG. 3, in another embodiment, an output of adjoining pairs of addresses to be subtracted of the minimum distance extraction circuit 304 may correspond to the most significant 1 of the smaller of the two addresses. The limits $l_1 \ldots l_m$ in 306 are integer powers of two. In another embodiment, when the buffer circuit 302 is implanted as a FIFO 302, the minimum distance extraction circuit 304 replaces the oldest address in the buffer circuit 302 with the current memory address. In another embodiment, the minimum distance extraction circuit 304 removes a nearest matching address in the buffer circuit 302 (e.g., this is #k in the buffer), but still inserts the new address at the top of the buffer and shift every address down in the FIFO 302. (e.g., from 1 . . . k−1).

The limit determination circuit 206 is configured to compare the minimum distance $d_{min}$ to each of a plurality of ranges of distances 312. Each of the plurality of ranges 312 has different upper limit (e.g. $l_1$). The limit determination circuit 206 is further to select a range of the plurality of ranges (e.g., 312) within which the minimum distance $d_{min}$ falls. In the limit determination circuit 206 shown in FIG. 3, each range (e.g., $l_1 < d < l_2$) of the plurality of ranges (e.g., 312) do not overlap with any other range. Each of the ranges has an upper limit (e.g. $l_1$) and a lower limit (e.g. $l_2$) that is the upper limit of the next lower range. There are m upper/lower limits in total. These m upper/lower limits may be implemented by m+1 comparator circuits (not shown).

Figure 5:
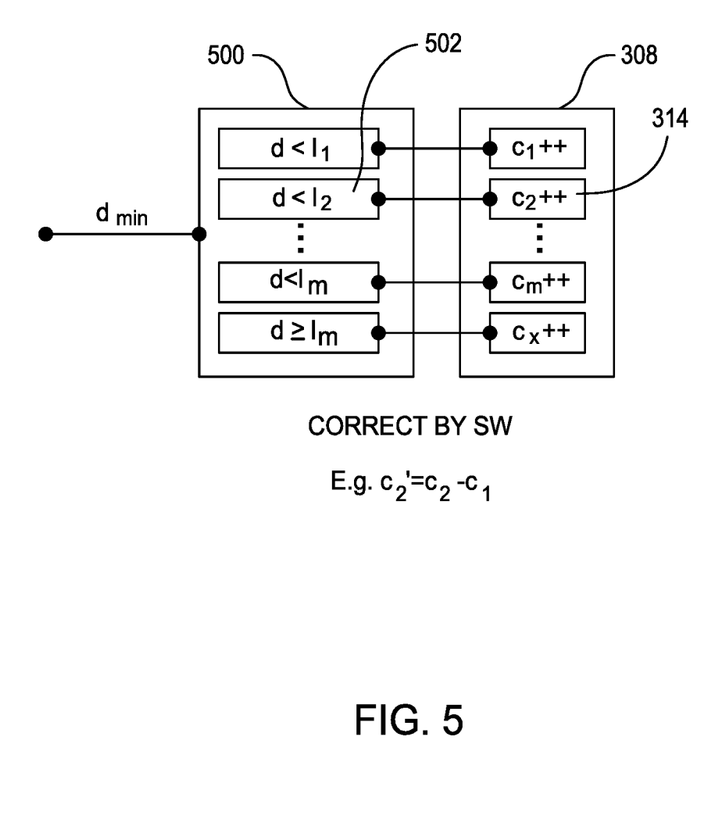
FIG. 5 is an electrical block diagram illustrating an alternative implementation of the limit determination circuit of FIG. 3.

FIG. 5 is an electrical block diagram illustrating an alternative implementation 500 of the limit determination circuit 206 of FIG. 3. Referring now to FIG. 5, in the alternative implementation of the limit determination circuit 500, a succeeding range (e.g., $d < l_2$) of the plurality of ranges 502 has an implied lower bound equal to zero such that succeeding ranges overlap but have different upper bounds (e.g., $d < l_m$) and common lower bounds (zero). In one example, each of the upper bounds (e.g., $d < l_m$) may be a binary power of two.

Referring again to FIG. 3, the counter circuit 208 has a plurality of counters 314. Each of the plurality of counters 314 is associated with a corresponding one of the plurality of ranges 312. A counter (e.g., $c_2$++) of the plurality of counters 314 is to be incremented corresponding to the determined range. There are m+1 counters corresponding to m+1 limits. When the lower bound of each range is zero as in FIG. 5, the counter outputs may be converted in software into non-overlapping bins by subtracting the count of an immediate prior upper bound ($l_i$) from a succeeding upper bound (e.g., $c_i = c_i - c_{i-1} - c_{i-2} - \ldots - c_1$). When the lower bound is zero and no subtraction of output counts take place, the output values of the counters 314 may be represented as a cumulative histogram in software. When accessed by a software program memory locality circuit 102, 300, a user can read out counters to obtain an overview of the memory access patterns of the memory 130.

Embodiment of the memory locality circuit 102, 300 is subject to numerous variations. The memory locality circuit 102, 300 may be reset to obtain a new set of counts, paused temporarily by software, and then resumed by the software. The first-out (FIFO) buffer 302 of FIG. 3 may be read from a set of hardware registers implemented on a processor core 121 or implemented in the memory 130. When not each hardware thread 182 has its own instance of the memory locality circuit 102, 300, the state of the thread circuit A may be saved to allow the next hardware thread circuit B to execute during a first context switch. The state of thread circuit A can then be resumed when it is time to restart the thread circuit A after another context switch. State parameters to save for each of the thread circuits A, B, includes the addresses in the FIFO 302, the minimum distance $d_{min}$, and the values of the counters $c_i$++. An example of a method for switching between thread circuits A, B may be represented by the following pseudo code:

At thread stop A, start B:
Save a backup of current addresses A
Accumulate counters for A
Restore backup of addresses for B
Reset counters for B to start
A similar approach would work for software threads.

The minimum distance extraction circuit 204, 304 may further comprise circuitry for limiting determining the minimum distance from the distances to a current memory address that represents a specified type of memory access command (e.g., limited to only load requests, only store requests, all requests, or to/from a specified (virtual) memory regions defined by a start address. The latter permits a user to inspect access behavior for one user-specified field of variables in an application. The minimum distance extraction circuit 204, 304 may further comprises circuitry for limiting determining the minimum distance from the distances to a current memory address that originates from a specified region of the memory 130 (e.g., a mask).

Figure 6:
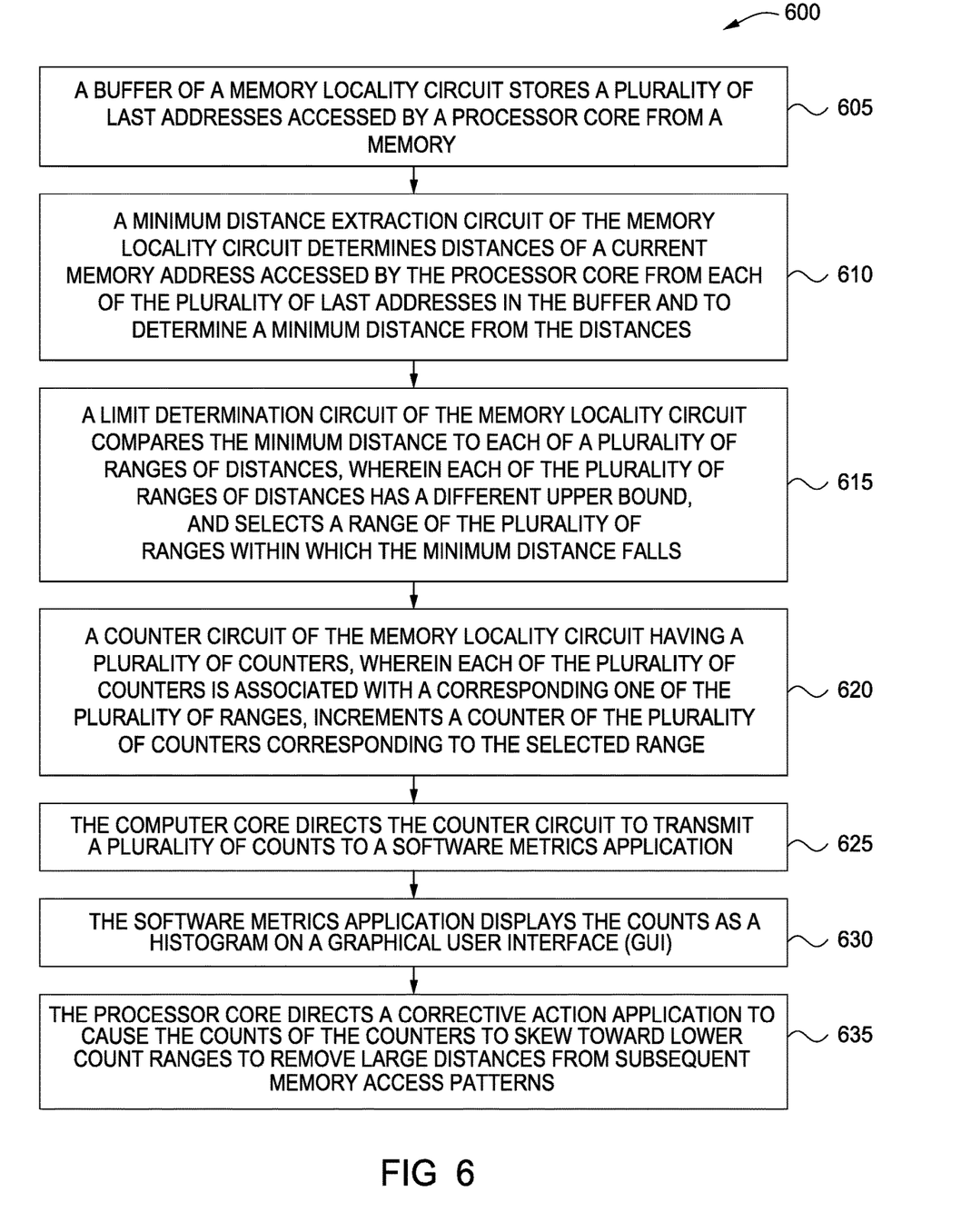
FIG. 6 illustrates a flow diagram that implements a method for determining memory address access patterns of a processor core.

FIG. 6 illustrates one embodiment of a method 600 for determining memory address access patterns of a processor core 121. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by the memory locality circuits 200, 300 of FIGS. 2 and 3, respectively.

At block 605, a buffer circuit 202, 302 of the memory locality circuits 200, 300 stores plurality of last addresses accessed by the processor core 121 from a memory 130. At block 610, a minimum distance extraction circuit 204, 304 determines distances of a current memory address accessed by the processor core 121 from each of the plurality of last addresses in the buffer circuit 202, 302 and to determining a minimum distance $d_{min}$ from the distances. In an embodiment, the minimum distance extraction circuit 204, 304 is further configured to implement a reduction tree of subtraction circuits.

At block 615, a limit determination circuit 206, 306 compares the minimum distance $d_{min}$ to each of a plurality of ranges of distances (e.g., $l_{i-1} < d < l_i$), each of the plurality of ranges of distances (e.g., $l_{i-1} < d < l_i$) having a different upper bound (e.g., $l_i$), and selects, a range of the plurality of ranges (e.g., $l_{i-1} < d < l_i$) within which the minimum distance $d_{min}$ falls. In an embodiment, the limit determination circuit 206, 306 comprises a plurality of comparators corresponding to the plurality of ranges 312. In one embodiment, each succeeding range of the plurality of ranges 312 has a lower bound that matches an upper bound of the immediately previous range such succeeding ranges do not overlap. In another embodiment, each succeeding range of the plurality of ranges 312 has a lower bound equal to zero such that succeeding ranges overlap but have different upper bounds and common lower bounds (zero).

At block 620, a counter circuit 208, 308 having a plurality of counters (e.g., $c_i$++) , each of the plurality of counters (e.g., $c_i$++) associated with a corresponding one of the plurality of ranges $l_{i-1} < d < l_i$), increments a counter of the plurality of counters (e.g., $c_i$++) corresponding to the selected range.

At block 625, the computer core 121 directs the counter circuit 208, 308 to transmit a plurality of counts 308 to a software metrics application. At block 630, the software metrics application displays the counts as a histogram on a graphical user interface (GUI) to provide a user with an indication of current memory access patterns. In another embodiment, the software metrics application displays the counts as a stream of histograms accumulated for a series of short intervals. Accordingly, the memory locality circuit 200, 300 measures statistics to identify what kind of memory access pattern is being produced in a running application running on the processor core 121 in a real-time execution environment without impacting the performance of the processor core 121. At block 635, the processor core 121 directs a corrective action application to cause the counts of the counters to skew toward lower count ranges to remove large distances from subsequent memory access patterns The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A memory locality circuit for determining memory address access patterns of a processor core, comprising:
    a buffer configured to store a plurality of last addresses accessed by the processor core from a memory;
    a minimum distance extraction circuit configured to determine distances of a current memory address accessed by the processor core from each of the plurality of last addresses in the buffer and to determine a minimum distance from the distances;
    a limit determination circuit configured to compare the minimum distance to each of a plurality of ranges of distances, wherein each of the plurality of ranges of distance has a different upper bound, and wherein the limit determination circuit is further configured to select a range of the plurality of ranges within which the minimum distance falls; and
    a counter circuit having a plurality of counters, wherein each of the plurality of counters is associated with a corresponding one of the plurality of ranges, and wherein a counter of the plurality of counters is configured to be incremented corresponding to the selected range.

2. The memory locality circuit of claim 1, wherein the buffer is a first-in, first-out (FIFO) buffer.

3. The memory locality circuit of claim 1, wherein the minimum distance extraction circuit is further configured to replace the oldest address in the buffer with the current memory address.

4. The memory locality circuit of claim 1, wherein the minimum distance extraction circuit is further configured to:
    remove the nearest matching address to the current memory address in the buffer;
    shift down all memory addresses in the buffer above the nearest matching memory address; and
    insert the current memory address at the beginning of the buffer.

5. The memory locality circuit of claim 1, wherein the minimum distance extraction circuit is further configured to implement a reduction tree of subtraction circuits.

6. The memory locality circuit of claim 1, wherein the limit determination circuit comprises a plurality of comparators corresponding to the plurality of ranges.

7. The memory locality circuit of claim 1, wherein each succeeding range of the plurality of ranges has a lower bound that matches an upper bound of the immediately previous range such succeeding ranges do not overlap.

8. The memory locality circuit of claim 1, each succeeding range of the plurality of ranges has a lower bound equal to zero such that succeeding ranges overlap but have different upper bounds and common lower bounds.

9. The memory locality circuit of claim 1, wherein the minimum distance extraction circuit further comprises circuitry for limiting determining the minimum distance from the distances to a current memory address that represents a specified type of memory access command.

10. The memory locality circuit of claim 1, wherein the minimum distance extraction circuit further comprises circuitry for limiting determining the minimum distance from the distances to a current memory address that originates from a specified region of memory.

11. A computer system, comprising:
    one or more processor cores;
    one or more memories coupled to the one or more processor cores; and
    one or more memory locality circuits for determining memory address access patterns of the one or more memories by the one or more processor cores, wherein each of the one or more memory locality circuits comprises:
        a buffer configured to store a plurality of last addresses accessed by the processor core from a memory;
        a minimum distance extraction circuit configured to determine distances of a current memory address accessed by the processor core from each of the plurality of last addresses in the buffer and to determine a minimum distance from the distances;
        a limit determination circuit configured to compare the minimum distance to each of a plurality of ranges of distances, wherein each of the plurality of ranges of distances has a different upper bound, and wherein the limit determination circuit is further configured to select a range of the plurality of ranges within which the minimum distance falls; and
        a counter circuit having a plurality of counters, wherein each of the plurality of counters is associated with a corresponding one of the plurality of ranges, and wherein a counter of the plurality of counters is configured to be incremented corresponding to the selected range.

12. The computer system of claim 11, wherein the minimum distance extraction circuit is further configured to replace the oldest address in the buffer with the current memory address.

13. The computer system of claim 11, wherein the minimum distance extraction circuit further comprises circuitry for limiting determining the minimum distance from the distances to a current memory address that represents a specified type of memory access command.

14. The computer system of claim 11, wherein the minimum distance extraction circuit further comprises circuitry for limiting determining the minimum distance from the distances to a current memory address that originates from a specified region of memory.

15. The computer system of claim 11, wherein a processor is associated with a corresponding hardware thread.

16. The computer system of claim 11, wherein the one or more processor cores is configured to save and restore a state of a specified memory locality circuit when the one or more processor cores switch between hardware or software threads of a plurality of hardware or software threads.

17. A method for determining memory address access patterns of a processor core, comprising:
 storing, by a buffer, a plurality of last addresses accessed by the processor core from a memory;
 determining, by a minimum distance extraction circuit, distances of a current memory address accessed by the processor core from each of the plurality of last addresses in the buffer and to determining a minimum distance from the distances;
 comparing, by a limit determination circuit, the minimum distance to each of a plurality of ranges of distances, wherein each of the plurality of ranges of distance has a different upper bound, and, selecting, by the limit determination circuit, a range of the plurality of ranges within which the minimum distance falls; and
 incrementing, by a counter circuit having a plurality of counters, wherein each of the plurality of counters is associated with a corresponding one of the plurality of ranges, a counter of the plurality of counters corresponding to the selected range.

18. The method of claim 17, further comprising replacing the oldest address in the buffer with the current memory address.

19. The method of claim 17, further comprising limiting determining the minimum distance from the distances to a current memory address that represents a specified type of memory access command.

20. The method of claim 17, further comprising limiting determining the minimum distance from the distances to a current memory address that originates from a specified region of memory.

* * * * *